…

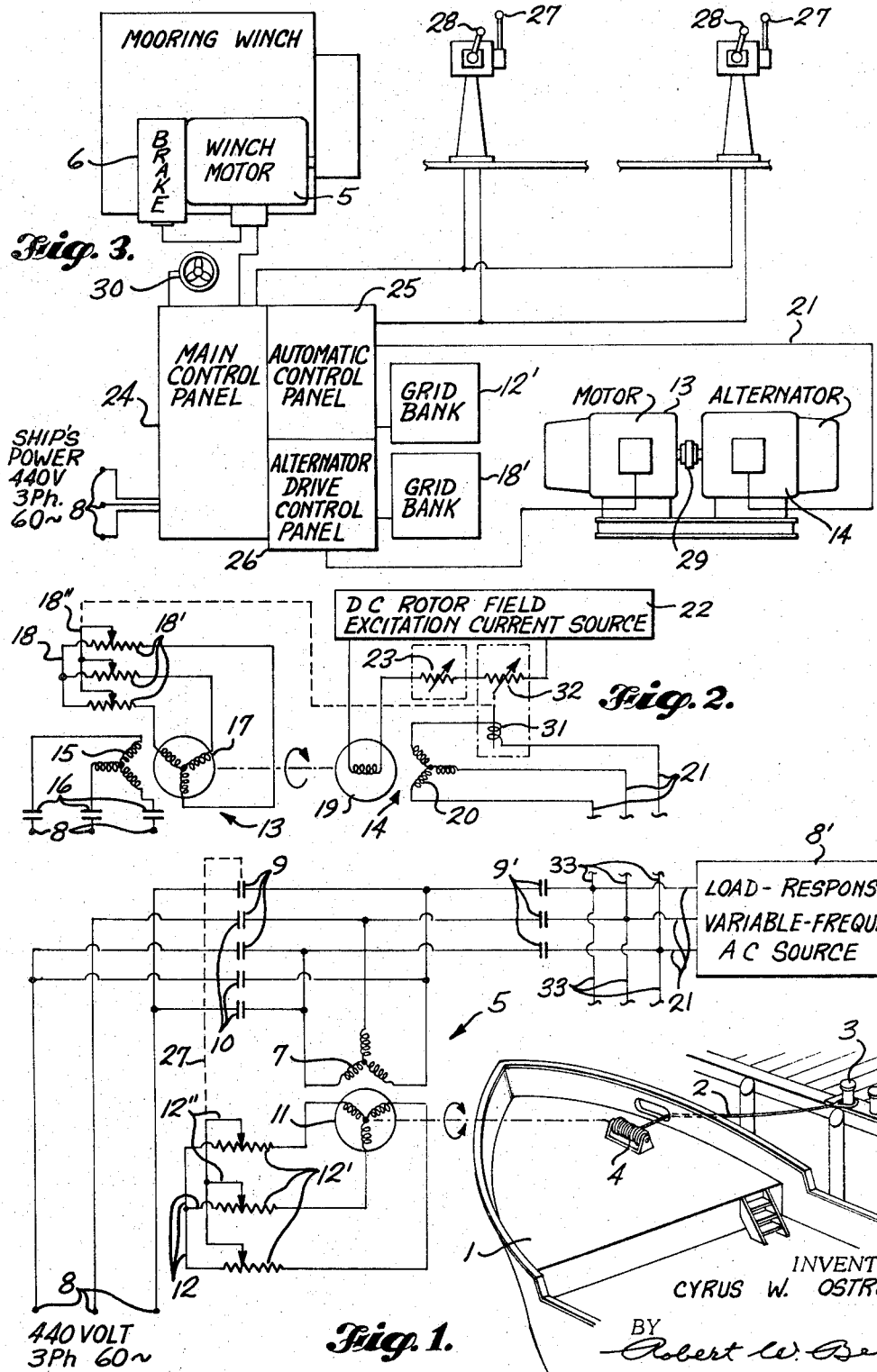

United States Patent Office 3,421,736
Patented Jan. 14, 1969

3,421,736
CONTINUAL TENSION LINE-TENSIONING MECHANISM
Cyrus W. Ostrom, Seattle, Wash., assignor to Consolidated Electric Corporation, Seattle, Wash., a corporation of Washington
Filed July 11, 1967, Ser. No. 652,578
U.S. Cl. 254—172    16 Claims
Int. Cl. B66d 1/48

ABSTRACT OF THE DISCLOSURE

A ship's mooring winch is driven by a polyphase phase-wound induction motor powered by constant frequency alternating current for reversible operation. Constant line tension can be maintained by supplying alternating current to the winch motor from an alternating-current source, the frequency of which is variable in response to the load on the winch. Such variable-frequency source may be an alternator driven by a phase-wound induction motor or by a squirrel-cage induction motor through a load-responsive slipping clutch or by a direct-current motor. The variable-frequency AC source is connected to the motor to drive the winch only in the reeling-in direction, but the tension on the line can retard the motor speed or stall the motor or rotate the winch and motor in the opposite direction against the driving torque of the motor. The winch-motor torque can be adjusted by varying the value of the resistance shunted across the rotor winding of the winch motor.

---

A principal object of the invention is to maintain tension on a line, such as a ship's mooring line, at a substantially constant selected value, whether the line is being reeled in, is stationary, or is being paid out. Companion objects are to prevent sudden surges on such a line, either in the reeling-in or in the paying-out direction, while enabling the length of the line to be altered automatically, such as would result in the case of a ship's mooring line from a change in tide level or a change in the waterline location on the ship's hull.

A further object is to provide mechanism for exerting a substantially constant tension in a line, irrespective of the movement of the line in a reeling-in or a paying-out direction, and for maintaining such line tension over a long period of time, even though the length of the line is not altered at all or is altered only to a small degree.

It is also an object to maintain continuous tension on a line by drive mechanism, always exerting on the line a force tending to reel in the line so as to avoid slack in the line which might cause it to become fouled.

More specifically, it is an object to maintain a constant tension on a line by mechanism acting in response to the line tension which, in turn, controls line-tensioning means.

Another object is to provide control mechanism for line-tensioning means which can be adjusted quickly to establish and maintain line tensions of different selected values.

It is also an object to control a plurality of line-tensioning devices by operation of a single control.

Another object of the present invention is to minimize changes in current demand required for the operation of line-tensioning mechanism by avoiding the operation of periodically connecting and disconnecting such mechanism from an electric supply line.

It is also an advantage of the present invention to eliminate the need for mechanical load-sensing mechanism and switching devices controlled by such load-sensing mechanism, thus reducing the initial cost of the installation as well as minimizing maintenance cost.

FIGURE 1 is a diagrammatic top perspective of a ship and a dock to which the ship is moored in conjunction with a wiring diagram of a ship winch drive motor.

FIGURE 2 is a wiring diagram of a preferred type of power supply for the winch driving mechanism of FIGURE 1.

FIGURE 3 is a diagram showing the relationship of and connections between various components of representative control mechanism.

Figure 4:
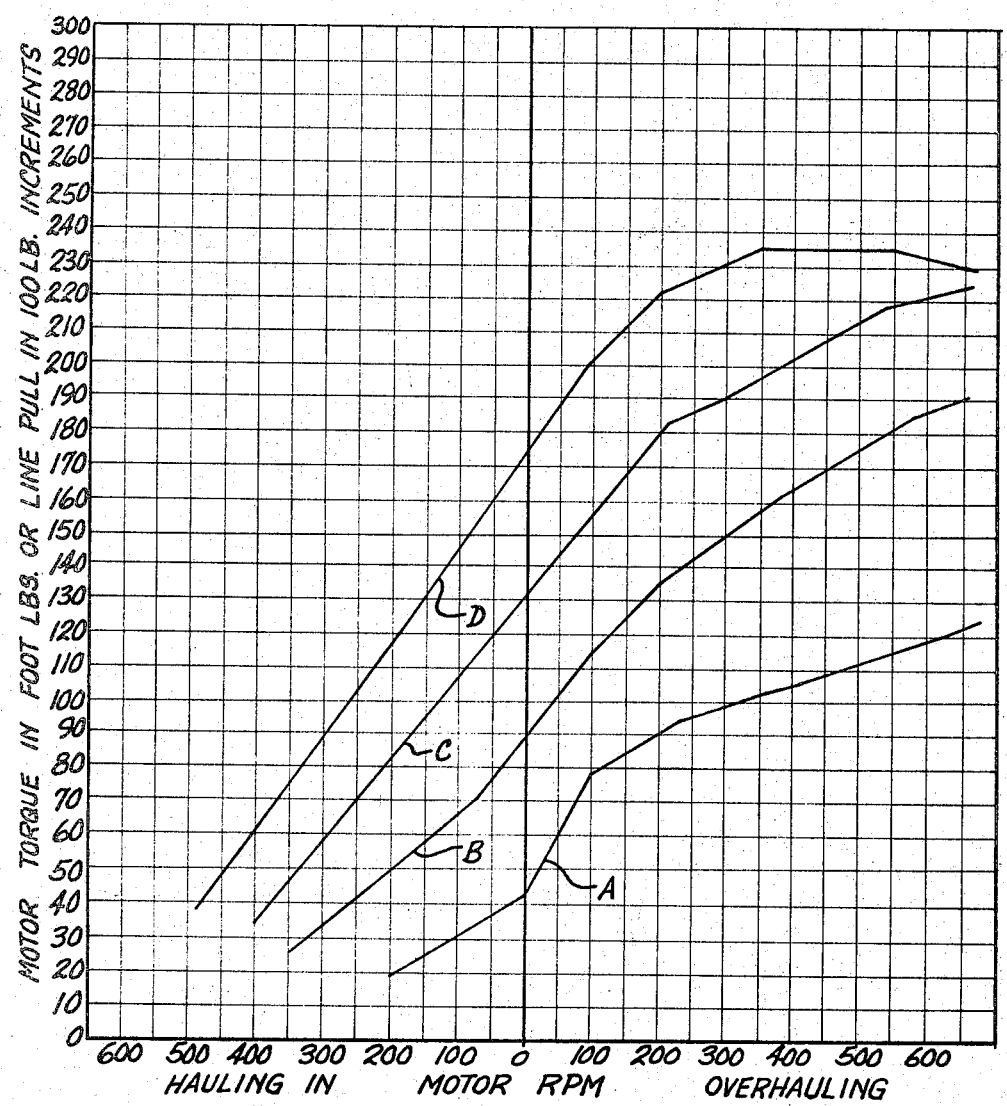
FIGURE 4 is a graph showing curves, indicating their relationship between winch motor speed and motor torque or line pull for various settings of the line-tensioning mechanism.

The system of the present invention exerts on a line, such as the mooring line of a ship, a selected substantially constant line tension for mooring purposes and is superimposed on line-hauling mechanism which alternatively can be controlled so that the tension on the line can be altered at will to reel in or pay out the line and by which the speed of operation or torque of the line-winding means can be altered at will. This invention has particularly advantageous application to the winch of a ship's mooring line and, consequently, the invention will be described with particular reference to this application, although it will be understood that such mechanism can be used in any type of installation in which it is desired to maintain a substantially constant line tension where the movement of the line is slight. Consequently, in the drawings the foredeck of a ship 1 is illustrated from which a line 2 extends to a bollard 3 on a dock.

The line 2 is tensioned by line-winding means, illustrated as a deck winch 4 to which a winch motor 5 is connected. When the winch motor is not in operation, the winch drum is secured against rotation by brake 6 as indicated in FIGURE 3. Such brake can be of the drum and band type in which the brake band is held in position clamping the brake drum by compression spring means. The clamping action of the brake drum is released automatically by an electric solenoid connected in circuit with the winch motor 5 so that when the winch motor is energized the brake solenoid will be energized simultaneously to release the braking action. Correspondingly, when the winch driving motor is de-energized the brake-releasing solenoid will be de-energized so that the brake band will be clamped by its spring to the brake drum so as to secure the winch drum against rotation.

The winch motor 5 is of the polyphase phase-wound induction type, including a three-phase Y-connected stator winding 7. During a mooring operation this winding can be connected to a constant frequency AC source 8, which may be the ship's AC supply. Such supply may, for example, be of the three-phase 60-cycles-per-second type having 440 voltage. Such AC source can be connected through a starting switch 9 in such phase relationship to the stator winding 7 as to energize the motor to turn in the direction for driving the winch drum 4 to reel in the mooring line. Conversely, the AC supply source 8 can be connected in a different phase relationship through reversing switch 10 to the stator winding 7 of the motor so as to cause the rotor of the motor to turn in a direction such that the winch drum 4 pays out mooring line 2.

While the starting switches 9 and 10 determine in which direction the winch motor 5 and drum of winch 4 will turn, the speed and torque of the motor in either direction will be determined by the manner in which the phase-wound coils of the rotor 11 are connected together. Such rotor windings are interconnected by wires 12, but such wires include in them slide-wire resistances 12' which can be bridged at different locations by a set of interconnected adjustable brushes 12″. These brushes can be moved conjointly along the slide wires 12′ in corresponding positions or the connections to the resistances can be in the form of taps and connectors can be provided for connecting together corresponding taps of the respective resistances 12′ to provide an equivalent variation in resistance value.

To operate the winch 4 in a normal operation effecting mooring of a ship, therefore, the switch 9 can be closed to energize the motor 5 for reeling in the mooring line 2 or the switch 10 can be closed to energize the motor 5 for driving the winch 4 to pay out the line 2 and the bridging connections 12″ can be set to decrease the effective resistance in the rotor connections for increasing the speed and/or torque of the motor to any desired value within the capability of the motor. When the ship has been brought into its desired mooring position the switches 9 and 10 are opened and the switch 9′ is closed to connect the stator winding 7 of the winch motor 5 continuously to a load-responsive variable-frequency AC source 8′ instead of to the constant-frequency AC source 8 to which the motor was connected by the switch 9 or the switch 10, to provide the desired operation for maintaining the ship in moored condition.

It should be noted first that the winding 7 of the winch motor 5 can be connected to the variable-frequency AC source 8′ only by the switch 9′ representing rotation of the motor and winch 4 in a reeling-in direction. More specifically, the motor cannot be connected to the variable-frequency AC source in a direction to pay out line, although, as will be discussed hereinafter, if sufficient tension is exerted on the line 2, the winch 4 and winch motor 5 not only can be stopped but can be turned by the line tension in a reverse or overhauling direction to enable line to be unreeled from the drum of winch 4 even though torque is being applied continuously to that drum by the motor 5 tending to reel in the line.

Whether the motor 5, when the switch 9′ is closed, will turn winch 4 in a direction to reel in line 2, or will be stopped, or actually will be turned reversely so that winch 4 will pay out line 2, depends upon the degree of torque exerted by the motor on the winch drum. Such torque, in turn, depends upon the power consumed by the motor and the amount of power consumed is governed by the amount of resistance 12′ in the connections between the coils of the rotor 11. The greater the amount of resistance, the less current will flow, the less will be the power absorbed by the motor and the smaller will be the torque developed by the motor.

As in the operation of the motor 5 when it is connected to the constant-frequency AC supply 8, it is also desirable to be able to alter the amount of resistance in the connections of rotor 11 when the motor is connected to the variable-frequency AC source 8′. The same resistance-adjusting mechanism can be used for altering the amount of the resistances 12′ between the rotor coils 11 and the bridging wires 12″ when current is supplied to the motor from the source 8′. Altering the amount of effective resistance in the connections between the rotor windings will, however, not have as great an effect on the torque exerted by the winch motor when it is connected to the variable-frequency AC source 8′ as when the motor is connected to the constant-frequency source 8 because the power consumed by the motor depends not only on the resistance in the rotor circuit, but, also, on the frequency and voltage applied to the stator winding 7.

As indicated in FIGURE 1, it is desirable for the frequency of the AC source 8′ to be variable in response to the mechanical torque load on the motor 5, which is reflected in the current supplied to the stator windings 7. As the mechanical torque load on the motor increases and the stator current increases, it is desirable for the frequency of the current supplied to the motor to drop so as to enable the motor 5 to have the type of operating characteristics desired, namely, characteristics of high torque but low speed. Consequently, it is preferred that the maximum frequency of the variable-frequency source 8′ be considerably lower than the frequency of the constant-frequency source 8. Instead of being 60 cycles per second, therefore, the maximum frequency of the source 8′ can, for example, be half that value, namely, 30 cycles per second. As the mechanical torque load increases on the mooring winch and motor, the frequency can be reduced progressively with increase in load to a value in the range of 15 to 20 cycles and the input voltage can drop from 220 volts to 120 to 130 volts, for example, while the current increases.

While the load-responsive variable-frequency AC source 8′ can be of various types, FIGURE 2 illustrates such a power source which has proven to be quite satisfactory. Such source is a motor-generator set, including a polyphase phase-wound induction motor 13 connected to drive an alternator 14. The stator windings 15 of such motor can be connected by a switch 16 to the ship's power supply 8, such as three-phase 60-cycle current having 440 voltage. The coils of rotor 17 are interconnected by wires 18 having in them resistances 18′. The degree of effective resistance can be selected or adjusted for calibration purposes by bridging wires 18″ which can be set so that under no load the alternator 14 will be turned at the speed of 600 r.p.m. to produce 30-cycle alternating current.

The coils of the alternator rotor 19 must be excited so as to magnetize the rotor for developing electricity in the stator windings 20 connected to the output line 21. Excitation current is supplied to the coils of the alternator rotor 19 from a DC source 22 which, conveniently, may be rectified AC. A variable resistance 23 in the rotor circuit can be adjusted to provide the desired current output at a particular speed of the alternator. Increase in electrical loading of the alternator reflected by an increase in current passing through the output leads 21 to the winch motor 11, because of the increase in mechanical torque load on such motor and the winch 4, will tend to reduce the speed of the alternator. Reduction in speed of the alternator would result in a decrease in output voltage and a reduction in frequency. The reduction in frequency would correspond directly to the reduction in alternator rotor speed.

For the purpose of describing the action of a load-responsive variable-frequency AC source 8′, the assumption is made that the mechanism shown in FIGURE 2 constitutes the AC source 8′ of FIGURE 1 so that the output lines 21 from the alternator 14 in FIGURE 2 are the input lines 21 to the winch motor 5 in FIGURE 1. An increase in load on mooring line 2 resulting from a tendency of the ship to move away from the mooring bollard 3 increases the mechanical torque load on the winch 4 and winch motor 5 so as to increase the demand for current flowing through the stator coils of such motor which are continuously connected to the variable-frequency AC source 8′ while the ship is being maintained in moored condition. Such increase in current must be supplied from the output leads connected to the stator windings 20 of alternator 14 so as to increase the electric power load on the alternator. As such output current load increases, it is desirable for the output frequency of alternator 14 to decrease, which can only result from a decrease in alternator speed. Such decrease in alternator speed can only result from a decrease in speed of the motor driving the alternator which, in the case of FIGURE 2, is the motor 13 caused by an increase in the mechanical torque load on such motor resulting from the increased electrical load on alternator 14 to which it is drivingly connected.

A characteristic of a polyphase phase-wound induction motor is that its speed is reduced as the mechanical torque load on it is increased and, consequently, such a motor is suitable for driving the alternator 14. Alternatively, motor 13 could be a DC motor which also has this characteristic. Another alternator-driving arrangement, which is load-responsive in the sense that an increase in mechanical torque load on it will cause a reduction in its speed, is one in which the motor 13 is an induction motor of the squirrel-cage type and the coupling 29 shown in FIGURE 3 between the motor and the alternator is a slipping clutch, the slip of which is increased by an increase in mechanical torque load on the alternator. Such a clutch may, for example, be of the eddy-current type.

While FIGURES 1 and 2 show representative circuit diagrams, the relationship of physical components of the system is portrayed to better advantage in FIGURE 3. The ship's power supply 8 can be connected to a main control panel 24 containing suitable fuses and, perhaps, switches 9 and 10. The automatic control panel 25 may be connected to the main control panel which, in turn, is also connected to the winch motor 5 and the brake 6. To such automatic control panel is connected the alternator 14 by a circuit 21. The alternator drive control 26 is connected to the motor 13 and may include the switches 16. The resistance grid bank 12' for the winch motor is connected to the automatic control panel 25 and the calibrating resistance grid bank 18' for the alternator drive motor, if it is of the phase-wound inductance type, is connected to the alternator drive control panel 26.

It is desirable for the winch drive motor 5 to be capable of being controlled from a plurality of locations remote from the control panels 24, 25 and 26. Consequently, it is desirable for such control panels to contain switch-actuating relays for the several switches 9, 10, 16 and 9' and simply to extend control circuits to suitable controllers. Two of such remotely located controllers are shown in FIGURE 3, each including a handle 27 for the purpose of controlling engagement of switch 9 or switch 10 and of adjusting in steps the amount of the resistances 12' effectively connected to the windings of rotor 11 through the bridging circuit 12". Each of the controllers also has a handle 28 operable to control closing of switches 16 and 9' in sequence. The main control panel 24, automatic control panel 25 and alternator drive control panel 26 will include appropriate interlocking connections so that one of the remote controllers cannot override another of the remote controllers, except to open the switches and de-energize the system.

In use, either handle 27 can be swung in one direction to close switch 9 for initiating energization of the winch motor 5 with the maximum amount of resistances 12' in the circuit. Continued movement of the same handle 27 in the same direction through successive steps will reduce progressively the amount of resistance 12' effectively in the circuit of rotor 11 so as to increase the speed or torque of the winch motor. If the handle 27 is moved in the opposite direction past its central position, it will effect opening of switch 9 and closing of switch 10 to effect reversal of the direction of rotation of motor 5. Continued movement of the handle 27 in such reverse direction will progressively decrease the amount of resistance 12' effectively in the circuit of the motor rotor 11 so as to increase the speed or torque of the motor.

After the handle 27 has been restored to its central "off" position, either handle 28 can be moved into a position to close switch 16 for the purpose of starting the drive motor 13 for alternator 20. When the motor is started, the handle can be moved further into "automatic" position. Handle 27 can then be moved into the first position corresponding to curve A of FIGURE 4, in which maximum resistance 12' is included in the circuit of rotor 11 of motor 5. Next the handle can be moved step-by-step into positions corresponding successively to curves B, C and D in FIGURE 4 in which the amount of resistance 12' in the circuit of winch motor rotor 11 is reduced progressively by effecting shifting of the bridging connections 12".

The effect of such manipulation of the controls on the operation of the winch 4 under "automatic" condition is illustrated by the curves A, B, C and D in FIGURE 4. When the handle 27 is in the first position, the winch motor 5 will drive the winch 4 to reel in line if the line pull is less than 2,000 pounds at a speed of 200 r.p.m. As the line pull increases and the mechanical torque of winch 4 and winch motor 5 increases correspondingly, the speed of the motor 5 and winch 4 decreases until they are stopped at a line pull of 4,300 pounds and a stalled or locked-rotor mechanical torque of 43 pound-feet. If the line pull increases beyond that value, line will be unreeled from the winch drum as the winch drum and motor are driven in the reverse direction and their mechanical torque is increased as shown by curve A and below the motor-stalled or locked-rotor mechanical torque value of 43 pound-feet, whereupon the motor 5 will immediately drive drum 4 to reel in line.

When the controller handle 27 is set in the second position corresponding to curve B of FIGURE 4, the same type of operation ensues, except that the critical value of line pull will be 9,000 pounds under motor-stalled or locked-rotor mechanical torque of 90 pound-feet. If the tension in line 2 should decrease below this value, the motor 5 will drive the winch 4 in a reel-in direction until that value of line tension is reached. If the line tension should increase above that value, line will be paid out at a speed depending upon the tension of the line until such tension has been reduced again to 9,000 pounds and the motor-stalled or lock-rotor mechanical torque is 90 pound-feet. If the controller is shifted to the third position corresponding to curve C, the critical value of line tension will be 13,200 pounds and of motor-stalled or locked-rotor mechanical torque will be 132 pound-feet. If the controller handle 27 is moved to the fourth position, the critical value of line tension will be increased to 17,500 pounds and of motor-stalled or locked rotor mechanical torque will be increased to 175 pound-feet. In each case, the motor and winch drum will be rotated to pay out or reel in line as may be necessary to restore the selected critical value of line tension for which the controller is set.

Even when the motor and winch are stopped, power is being consumed. Also, the higher the line pull and torque, the greater will be the load on the variable-frequency AC source 8' and, consequently, the lower will be the frequency and voltage. Such reduction in frequency and voltage will, of course, be the result of the reduction in speed of the motor 13 in a motor-alternator type of AC source. A typical table of alternator drive motor speed, alternator motor current, alternator voltage output, alternator frequency output, winch motor current, line pull and power consumed for various adjusted positions of the controller 27 are given in the table at page 16.

The power consumed when the winch motor and winch are not moving generates heat and, consequently, it may be desirable to provide suitable means for cooling the motor 5 and resistance grid banks 12' and 18' and, perhaps, the motor 13 and alternator 14. Such cooling mechanism is represented by a fan 30 shown in FIGURE 3 which would be energized whenever the switch 9' is closed.

Where it is desired to maintain a very heavy line pull, the curve of line pull versus motor r.p.m. may break from linearity more abruptly than desired at the overhauling side of the center of the graph shown in FIGURE 4. Under such circumstances it may be desirable to deter reduction in frequency and voltage of the output of alternator 14 to a greater or lesser extent. This effect can be achieved by including in the output circuit 21 of the alternator a current-sensitive relay 31. This relay may adjust a variable resistance 32 in circuit with the DC rotor field excitation current source 22 connected to the alternator rotor 19. As the resistance 32 is reduced, the excitation current in rotor 19 is increased to increase the output voltage in line 21. It has been found to be satisfactory to make the variable resistance 32 of the two-position type so that when the relay 31 is energized the resistance 32 will be reduced from its normal operating value to a predetermined overload value. Alternatively, operation of the relay 31 in response to an alternator output current higher than a predetermined value could effect adjustment of the bridging connection 18" to reduce the value of the resistance 18' in the rotor circuit of the alternator drive motor. Such resistance adjustment would increase the torque developed by such drive motor so as to reduce the speed reduction of the alternator under a given load. If desired, the current-responsive relay 31 could act both to decrease the resistance 18' in the rotor circuit of the alternator drive motor and decrease the resistance in the exciter circuit of the alternator rotor.

It will be appreciated that the system of the present invention operates to reel in line or enable line to be paid out as may be necessary in an attempt to maintain the line tension as near as possible to a selected value irrespective of the length of the line and irrespective of the amount of line which is reeled in or paid out. Moreover, such selected line tension is substantially maintained automatically for an indefinite period without attention on the part of an operator. If it is desirable to control more than one line from such control mechanism, the supply lines 21 from the variable-frequency AC source 8' can be connected by lines 33 to another or other winch motors, in which case the alternator output frequency and voltage or AC source frequency will vary in response to the combined load on all of the winch motors connected in the system.

The winch motor 5, alternator drive motor 13 and alternator 14 are all of standard construction, as are the switches 9, 10, 16 and 9'. No complex relay or circuit-breaker system is required, although relays to provide for remote control by the handles 27 and 28 are needed and normal fuses or overload circuit-breakers should be provided in the system, as will be apparent to persons skilled in the art. No particular tolerance or variation from a selected line tension is required to effect operation of the system, but the system will maintain a steady pull on the line even if no conditions occur which would alter the line pull. If the line pull drops below the selected value, thus reducing the load on the variable-frequency AC source 8', the frequency will increase, thus automatically increasing the power available to the winch motor for expediting winding in rotation of the winch 4 to restore the line tension to the predetermined value. Thus, the ship is eased back into position without appreciable hunting or overtravel.

Power utilized is minimum because driving movement of equipment is effected only as and when necessary to restore the selected line tension. Despite the tendency of the automatic system to maintain its stability, the selected line tension can be varied easily and instantaneously or the automatic mechanism can be rendered inoperative and the winch motor immediately placed under manual control to effect voluntary rotation of the winch drum in either direction without reference to line pull.

mechanical torque produced on said line-winding means by said line-winding means motor, an electric power source continuously connected to said line-winding means motor during ship-moored operation to provide electric current thereto continuously for producing mechanical torque an said line-winding means tending to reel in line whether said line-winding means motor is stopped or turning in the line reeling-in direction or turning in the line paying-out direction, and load-responsive means responsive to the electric current load on said electric power source resulting from the mechanical torque produced by said line-winding means motor on said line-winding means and operable to vary an output characteristic of said electric power source automatically in response to variation in mechanical torque exerted by said line-winding means motor on said line-winding means resulting from changes in mooring line load and corresponding variation in electric current load on said electric power source.

2. The line-tensioning mechanism defined in claim 1, in which the electric power source is a rotating generator, and the load-responsive means is a variable-speed drive connected to drive said generator and variable in speed with change in speed of said generator in response to changes in the electric current load on said generator produced by the line-winding means motor.

3. The line-tensioning mechanism defined in claim 2, in which the line-winding means motor is a polyphase phase-wound induction motor, and the rotating generator is an alternator providing a variable frequency AC source the output frequency of which is varied in response to speed changes of the alternator caused by variation in mechanical torque exerted by the line-winding means motor on the line-winding means.

4. The line-tensioning mechanism defined in claim 1, in which the electric power source is a variable frequency AC source the output frequency of which is varied in response to variation in mechanical torque extered by the line-winding means motor on the line-winding means.

5. The line-tensioning mechanism defined in claim 4, in which the line-winding means motor is a polyphase phase-wound induction motor.

6. The line-tensioning mechanism defined in claim 4, in which the variable-frequency AC source is an alternator driven by a variable-speed motor.

7. The line-tensioning mechansim defined in claim 6, in which the variable-speed motor is a polyphase phase-wound induction motor.

8. The line-tensioning mechanism defined in claim 6, in which the variable-speed motor is a DC motor.

9. The line-tensioning mechanism defined in claim 4, in which the variable-frequency AC source is an alternator, and driving means for said alternator including a squirrel-cage induction motor and load-responsive coupling means responsive to variation in electric current load on the AC source and connecting said squirrel-cage induction motor and said alternator.

| Controller position | Alternator motor speed (r.p.m.) | Alternator motor secondary current (amps) | Alternator motor power (kw) | Alternator speed (r.p.m.) | Alternator output frequency | Alternator output voltage (volts) | Alternator output current (amps) | Winch motor secondary current (amps) | Line pull (pounds) |
|---|---|---|---|---|---|---|---|---|---|
| Centered | 1,730 | | 4.6 | 577 | 28.9 | 220 | 0 | 0 | 0 |
| 1 | 1,600 | 3 | 8.4 | 533 | 26.7 | 185 | 24 | 9 | 4,300 |
| 2 | 1,500 | 10.5 | 11.6 | 500 | 25 | 170 | 27 | 18 | 8,240 |
| 3 | 1,415 | 13 | 14.4 | 472 | 23.6 | 158 | 32 | 26 | 11,200 |
| 4 | 1,260 | 26 | 22.8 | 420 | 21 | 129 | 44 | 47 | 16,400 |
| 4* | 1,180 | 28 | 25.6 | 393 | 19.7 | 133 | 46 | 47 | 17,000 |

*With alternator excitation increased by decrease in resistance of alternator rotor circuit.

I claim:

1. Line-tensioning mechanism for mooring a ship comprising line-winding means connected to a mooring line, an electric line-winding means motor continuously connected to supply continuous mechanical torque to said line-winding means for winding in such mooring line whenever the mechanical torque on said line-winding means produced by such line tends to drop below the 10. The line-tensioning mechanism defined in claim 5, and electrical resistance means in the rotor circuit of the line-winding means motor, adjustable to vary the mechanical torque produced by such motor when its rotor is stationary.

11. The line-tensioning mechanism defined in claim 4, a substantially constant-frequency AC source, and switching means operable to connect the line-winding means motor selectively to the variable-frequency AC source and to the substantially constant-frequency AC source.

12. The line-tensioning mechanism defined in claim 11, in which the line-winding means motor is a polyphase phase-wound induction motor, electrical resistance means connected in the rotor circuit of the line-winding means motor, and controller means operable both when the variable-frequency AC source is connected to the line-winding means motor and when the substantially constant-frequency AC source is connected to the line-winding means motor to alter the resistance of said electrical resistance means for changing the mechanical torque produced by the line-winding means motor.

13. The line-tensioning mechanism defined in claim 11, and a controller connected between the substantially constant-frequency AC source and the line-winding means motor and operable to connect the substantially constant-frequency AC source to the line-winding means motor selectively in different phase relationships for selectively drawing such motor in forward and reverse directions.

14. The line-tensioning mechanism defined in claim 4, in which the variable-frequency AC source includes an alternator, and control means responsive to output current from the alternator to the line-winding means motor and operable to increase the output voltage of the alternator in response to production by the alternator of an output current exceeding a predetermined value.

15. The line-tensioning mechanism defined in claim 14, a DC current source connected in the rotor circuit of the alternator to provide excitation, and variable-resistance means in such rotor circuit, the control means being operable in response to increase in the alternator output current exceeding the predetermined value to decrease the electrical resistance of said variable-resistance means to increase the excitation current provided by said DC current source to the alternator rotor circuit.

16. The line-tensioning mechanism defined in claim 7, adjustable resistance in the rotor circuit of the variable-speed motor, and control means responsive to output current from the alternator to the line-winding means motor and operable in response to increase in the alternator output current exceeding a predetermined value to decrease the electrical resistance in the rotor circuit of the variable-speed motor.

References Cited

UNITED STATES PATENTS

| 2,275,953 | 3/1942 | Frisch | 254—172 |
|---|---|---|---|
| 2,414,473 | 1/1947 | Mahnke | 254—172 |
| 2,685,055 | 7/1954 | Winther | 318—231 |
| 2,761,097 | 8/1956 | Tourneau | 318—148 |
| 2,895,096 | 7/1959 | Wallace | 318—231 |

EVON C. BLUNK, *Primary Examiner.*

HARVEY C. HORNSBY, *Assistant Examiner.*

U.S. Cl. X.R.

307—73; 318—148, 231, 6

UNITED STATES PATENT OFFICE
CERTIFICATE OF CORRECTION

Patent No. 3,421,736                                                       January 14, 1969

Cyrus W. Ostrom

It is certified that error appears in the above identified patent and that said Letters Patent are hereby corrected as shown below:

Column 4, line 64, "alternator" should read -- alternator, --; line 65, "13" should read -- 13, --. Column 6, line 25, "lock" should read -- locked --. Column 8, line 6, "an" should read -- on --; line 70, "motor," should read -- motor --. Column 9, line 20, "drawing" should read -- driving --.

Signed and sealed this 17th day of March 1970.

(SEAL)
Attest:

Edward M. Fletcher, Jr.                                        WILLIAM E. SCHUYLER, JR.
Attesting Officer                                                   Commissioner of Patents